United States Patent
Kush et al.

(10) Patent No.: US 9,822,664 B1
(45) Date of Patent: Nov. 21, 2017

(54) TURBINE EXHAUST CYLINDER BAFFLE SEAL AND METHOD FOR INSTALLING TURBINE EXHAUST CYLINDER BAFFLE SEAL

(71) Applicant: Calpine Corporation, Houston, TX (US)

(72) Inventors: Ivan Kush, League City, TX (US); Larry Nolan Henson, Conroe, TX (US)

(73) Assignee: CALPINE CORPORATION, Houston, TX (US)

( * ) Notice: Subject to any disclaimer, the term of this patent is extended or adjusted under 35 U.S.C. 154(b) by 1022 days.

(21) Appl. No.: 13/827,800

(22) Filed: Mar. 14, 2013

(51) Int. Cl.
*F01D 25/24* (2006.01)
*B23P 6/00* (2006.01)

(52) U.S. Cl.
CPC .............. *F01D 25/24* (2013.01); *B23P 6/005* (2013.01); *F01D 25/243* (2013.01); *F05D 2230/60* (2013.01); *F05D 2230/70* (2013.01); *F05D 2230/80* (2013.01); *Y10T 29/4973* (2015.01); *Y10T 29/49318* (2015.01)

(58) Field of Classification Search
CPC ........ F01D 25/24; F01D 25/243; F01D 25/26; B23P 6/002; B23P 6/005; B23P 6/045; Y10T 29/4973; Y10T 29/49318; Y10T 29/49721; Y10T 29/49732; Y10T 29/49734; Y10T 29/49735; Y10T 29/49739; Y10T 403/64; Y10T 403/642; Y10T 403/645; F05D 2230/60; F05D 2230/70; F05D 2230/80; F02C 7/20

USPC ..... 415/207, 211.2, 214.1; 60/796, 797, 798
See application file for complete search history.

(56) References Cited

U.S. PATENT DOCUMENTS

| | | | |
|---|---|---|---|
| 4,007,587 A | 2/1977 | Banthin et al. | 60/204 |
| 4,135,362 A | 1/1979 | Glenn | 60/39.16 |
| 4,215,537 A | 8/1980 | Hurley | 60/264 |
| 4,438,939 A | 3/1984 | Pask et al. | 277/236 |
| 4,566,270 A | 1/1986 | Ballard et al. | 60/264 |
| 4,677,822 A | 7/1987 | Iizuka et al. | 60/39.23 |
| 4,747,750 A | 5/1988 | Chlus et al. | 415/172 |
| 4,800,715 A | 1/1989 | Conway | 60/39.5 |
| 4,932,207 A | 6/1990 | Harris et al. | 60/39.32 |

(Continued)

OTHER PUBLICATIONS

Xia, J. et al. "SGT6-5000F (W501F) 3 Million Hours Fleet Operational Experience." Siemens Power Generation, Inc. Power-Gen International, Orlando Florida, Nov. 28-30, 2006 (16 pages).

*Primary Examiner* — Essama Omgba
*Assistant Examiner* — Stephen Mick
(74) *Attorney, Agent, or Firm* — Nixon Peabody LLP

(57) ABSTRACT

A gas turbine includes an exhaust cylinder comprising an inner circumferential slot, a diffuser shell disposed at least substantially concentrically within the exhaust cylinder and one or more baffle plates extending between the exhaust cylinder and the diffuser shell, a proximal end of each of the one or more baffle plates being fixed to the diffuser shell by one or more holding rings and a distal end of each of the one or more baffle plates being slidingly received within the inner circumferential slot of the exhaust cylinder. The one or more holding rings are secured to the diffuser shell, at one or more holding segments disposed along an inner diameter of the diffuser shell, via a plurality of radially inserted fastening members.

16 Claims, 15 Drawing Sheets

(56) References Cited

U.S. PATENT DOCUMENTS

| | | | |
|---|---|---|---|
| 5,104,286 A * | 4/1992 | Donlan | F01D 25/30 277/641 |
| 5,383,672 A * | 1/1995 | Cornelius | F16J 15/3268 277/553 |
| 5,462,088 A | 10/1995 | Poux et al. | 138/39 |
| 5,482,435 A | 1/1996 | Dorris et al. | 416/97 R |
| 5,509,669 A | 4/1996 | Wolfe et al. | 277/167.5 |
| 5,586,773 A | 12/1996 | Bagepalli et al. | 277/167.5 |
| 5,657,998 A | 8/1997 | Dinc et al. | 277/230 |
| 5,699,662 A | 12/1997 | Born et al. | 60/39.5 |
| 5,915,697 A | 6/1999 | Bagepalli et al. | 277/627 |
| 6,039,287 A | 3/2000 | Liston et al. | 244/54 |
| 6,065,756 A | 5/2000 | Eignor et al. | 277/545 |
| 6,253,540 B1 | 7/2001 | Chew et al. | 60/262 |
| 6,733,234 B2 | 5/2004 | Paprotna et al. | 415/138 |
| 6,792,758 B2 | 9/2004 | Dowman | 60/772 |
| 6,807,803 B2 | 10/2004 | Poccia et al. | 60/39.5 |
| 6,926,284 B2 | 8/2005 | Hirst | 277/603 |
| 6,942,452 B2 | 9/2005 | Bruno et al. | 415/135 |
| 6,988,674 B2 | 1/2006 | Steyer et al. | 239/265.19 |
| 7,313,909 B2 | 1/2008 | Skoog et al. | 60/39.5 |
| 7,845,649 B2 | 12/2010 | Kowalczyk | 277/641 |
| 7,895,840 B2 | 3/2011 | Haller | 60/751 |
| 7,926,285 B2 | 4/2011 | Tisdale et al. | 60/770 |
| 7,980,055 B2 | 7/2011 | Lindenfeld | 60/39.5 |
| 8,146,341 B2 | 4/2012 | Siden et al. | 60/39.182 |
| 8,337,153 B2 | 12/2012 | Orosa | 415/182.1 |
| 2005/0039462 A1 * | 2/2005 | Bellows | B01D 53/1418 60/772 |
| 2006/0053768 A1 * | 3/2006 | Anderson | F01D 25/243 60/226.1 |
| 2006/0253311 A1 * | 11/2006 | Yin | G06Q 10/0631 705/7.12 |
| 2006/0260292 A1 | 11/2006 | Tanioka | 60/39.511 |
| 2010/0135770 A1 * | 6/2010 | Durocher | F01D 9/065 415/69 |
| 2010/0205930 A1 * | 8/2010 | Conete | F02K 1/04 60/226.1 |
| 2010/0269480 A1 | 10/2010 | Lindenfeld | 60/39.5 |
| 2011/0005234 A1 * | 1/2011 | Hashimoto | F01D 25/30 60/796 |
| 2012/0023968 A1 * | 2/2012 | Shteyman | F01D 25/243 60/796 |
| 2012/0186261 A1 | 7/2012 | Toprani et al. | 60/772 |
| 2013/0149120 A1 * | 6/2013 | Munshi | F01D 25/08 415/177 |
| 2014/0026999 A1 * | 1/2014 | Frailich | F01D 25/162 138/39 |

* cited by examiner

TURBINE EXHAUST CYLINDER BAFFLE SEAL AND METHOD FOR INSTALLING TURBINE EXHAUST CYLINDER BAFFLE SEAL

FIELD OF THE INVENTION

The invention relates to new design for a turbine exhaust cylinder baffle seal, as well as a method for installing the turbine exhaust cylinder baffle seal.

BACKGROUND

FIG. 1 shows a side view of an example of a conventional gas turbine 10 used in power generation. The gas turbine 10 includes a compressor 20, combustion chamber 30, turbine 40, and exhaust diffuser 50. In operation, air enters air intake 5, where it is compressed by the compressor 20 and directed into the combustion chamber 30. In the combustion chamber 30, the compressed air is mixed with fuel gas and injected into the combustion chamber 30 via nozzles 25. The mixture of compressed air and gas is burned within the combustion chamber 30 to generate a high-temperature, high-pressure combustion gas, which is used to drive the blades of the turbine 40 to thereby cause rotation of the rotor, to which the blades are attached. Exhaust gas from the turbine 40 is directed into an exhaust diffuser 50.

FIG. 2 shows a cross-sectional view of an example of an exhaust cylinder section 50 connected to a discharge of a turbine cylinder section 40 to receive therefrom exhaust gas 79 from the last row of turbine blades 55. The exhaust cylinder section 50 comprises an exhaust cylinder or outer diffuser shell 52 and an inner diffuser shell 61, which enclose a generally cylindrical inner shell 72. From the exhaust section 50, the hot gas 79 output by the turbine cylinder section 40 may be directed, for example, to a heat recovery steam generator (HRSG).

The journal bearing housing 72 and inner diffuser shell 61 form a portion of the flow path 81 for the hot gas 79. The journal bearing housing 72 supports a rotor 56 via bearing 60. Struts 57 support the bearing housing and extend between the bearing housing and the outer diffuser shell 52 and which connect to the outer diffuser shell 52 at their distal ends 71. The portion of the struts 57 between the inner shell 72 and the exhaust cylinder or outer diffuser shell 52 are enclosed by a shield 58 to protect the struts 57 from the exhaust gas.

As shown in FIG. 2, the exhaust cylinder section 50 also includes an exhaust manifold outer cylinder 53 extending downstream from the exhaust cylinder 52. The exhaust manifold outer cylinder 53 is bolted at its upstream flange 63 to the exhaust cylinder 52 downstream flange 64. A flow guide 62 extends from the exhaust manifold outer cylinder 53 inboard of the flange 63 to smooth a boundary flow path of exhaust gas from the inner diffuser shell 61. Likewise, an exhaust manifold inner cylinder 54 extends downstream from the inner cylinder 72. The turbine cylinder 51 is bolted to the upstream flange 80 of the exhaust cylinder 52. A shroud 69 attached to the turbine cylinder encircles the tips of the last row of turbine blades 55.

FIG. 2 shows an annular cavity 67 formed between the inner diffuser shell 61 and the exhaust cylinder or outer diffuser shell 52, the inner diffuser shell 61 forming a boundary between the hot gas path 81 and the annular cavity 67. A seal 65 is provided to extend between the OD of the inner diffuser shell 61 rear flange 66 and the ID of the exhaust cylinder 52 rear flange 64 and to extend a full 360 degrees around the cavity 67 to obstruct flow through the cavity.

As can be readily appreciated from the construction noted above, access to, for example, the seal 65 requires dismantling of the exhaust manifold outer cylinder 53 from the exhaust cylinder 52 and corresponding movement of such sections, together with associated movement of the exhaust cylinder 52 and/or inner diffuser shell 61.

For years certain industrial gas turbines (e.g., the 501F gas turbine, the 501G gas turbine) have encountered recurring failures of components such as the air baffles and dead air space baffles. Despite numerous iterations of attempts to fix this problem by the manufacturer of the gas turbine and by the gas turbine industry users group (the air baffles are on the $6^{th}$ design iteration and the dead air space baffles are on the $2^{nd}$ design iteration), both the original design and the subsequent design iterations have all proven susceptible to failure, often with only about 6 months of service.

FIG. 4A shows a perspective view of the exhaust cylinder section of a 501F gas turbine showing the exhaust cylinder 100, the diffuser shell 110, the bearing support 115, struts 118, strut shielding 119, and dead air space baffles 120.

FIG. 5 shows a close-up perspective view of a portion of FIG. 4A, showing in more detail portions of the exhaust cylinder 100, diffuser shell 110, and dead air space baffles 120. FIG. 5 shows that the dead air space baffles 120 are connected, at a distal end, to the flange 102 of the exhaust cylinder 100 via slot 101 and are connected, at a proximal end, to diffuser shell 110 via the holding ring 130. The holding ring 130 is, in turn, held in place using a plurality of bolts extending through bolt holes 131, 121 and 111, formed in the holding ring, dead air space baffle, and diffuser shell, respectively. The dead air space baffles 120 prevent hot exhaust gas from flowing over the bearing support struts in the annular cavity formed between the inner diffuser shell and the exhaust cylinder (see, e.g., FIGS. 4A-4B). In this region, the support struts are not protected by shielding and the hot exhaust gas will soften the struts over time, causing the struts 118 shown in FIGS. 4A-4B to deform. This deformation in turn alters the spatial location of the bearing support structure 115 and, as the location of the bearing support structure changes (i.e., sinks), the back end of the rotor lowers, which elevates the compressor end of the gas turbine. Following a small degree of such deformation and movement of the bearing support, the compressor blades impact the compressor shell, with predictable, destructive results.

To avoid such catastrophic damage, the owners of these turbines frequently incur significant outages to periodically replace damaged dead air space baffles 120. The costs of such outages include, but are not limited to, lost power generation revenue, potential contractual production penalties if the turbine generation is part of a long term power agreement, potential penalties if the turbine/HRSG steam generation is pre-sold contractually, potential loss of goodwill to customers and/or business partners based on an inability to meet demand, the cost of bringing in additional plant staff and Outage Services Staff (OSS) to cover the outage (increased overhead), the cost of renting a 100-Ton crane for the duration of the outage, the cost of having scaffolding built, the cost of bringing in insulators, the cost of replacing instruments that are damaged or destroyed during disassembly, the cost of the manpower (craft laborers-millwrights/pipefitters, etc. . . . ) to perform the outage to include travel and expenses for about 8 specialized workers (for up to about 12 days), the cost of a day and night shift Craft Labor Supervisor to include travel and expenses for up to about 12 days, the cost of a day and night shift Engineer to include travel and expenses for up to about 12 days, the cost of bringing in an Alignment specialist and spending several days re-aligning the cases, the cost of a safety engineer for oversight up to about 12 days, the cost of the parts, and the cost of the startup gas. These costs can easily top $150,000 per outage.

SUMMARY OF THE INVENTION

It is an object of the current invention to provide an improved dead air space baffle seal to prevent the turbine exhaust from directly impinging on unprotected portions of the gas turbine struts.

It is another object of the current invention to provide a dead air space baffle seal that is easy to install without expensive equipment, large crews, or significant gas turbine out of service time.

In at least some aspects of the present concepts, a gas turbine comprises an exhaust cylinder comprising an inner circumferential slot, a diffuser shell disposed at least substantially concentrically within the exhaust cylinder, and one or more baffle plates extending between the exhaust cylinder and the diffuser shell, a proximal end of each of the one or more baffle plates being fixed to the diffuser shell by one or more holding rings and a distal end of each of the one or more baffle plates being slidingly received within the inner circumferential slot of the exhaust cylinder, wherein the one or more holding rings are secured to the diffuser shell, at one or more holding segments disposed along an inner diameter of the diffuser shell, via a plurality of radially inserted fastening members.

In at least some aspects of the present concepts, a method of replacing a baffle plate in a gas turbine comprising the acts of removing baffle plate holding ring fastening members, in a radial direction, from one or more holding rings attached to a diffuser shell, removing one or more baffle plate holding rings corresponding to the removed baffle plate holding ring fastening members and removing one or more baffle plates corresponding to the one or more removed baffle plate holding rings, wherein each of the acts of removing are performed while the exhaust cylinder is attached to the turbine cylinder. This method of replacing a baffle plate in a gas turbine may further include the acts of inserting one or more baffle plates corresponding to the one or more removed baffle plates, inserting one or more baffle plate holding rings corresponding to the removed one or more baffle plate holding rings, inserting baffle plate holding ring fastening members, in a radial direction, into the one or more baffle plate holding rings to attach the one or more baffle plate holding rings to the diffuser shell, and fastening the baffle plate holding ring fastening members to secure in place the one or more baffle plate holding rings and the one or more baffle plates, wherein each of the acts of inserting, and the act of fastening, are performed while the exhaust cylinder is attached to the turbine cylinder.

In yet other aspects of the present concepts, a gas turbine exhaust cylinder sealing system includes an arcuate baffle plate having a proximal portion and a distal portion and an arcuate baffle plate holding ring, the arcuate baffle plate holding ring comprising a first arcuate radial portion and one or more second transverse portions extending at least substantially perpendicularly from the first radial portion, wherein the arcuate baffle plate is directly connected, at the proximal portion, to the first arcuate radial portion of the arcuate baffle plate holding ring using one or more removable fastening members, and wherein the one or more second transverse portions each define through holes therein to permit insertion of fastening members therethrough.

In contrast to extensive cost, time and inconvenience associated with the prior art baffle plate systems, the present concepts, following installation, permits baffle plates to be replaced as needed for merely the cost of the replacement parts and the services of one or two maintenance technicians, and permits such replacements to be performed opportunistically on short notice whenever the gas turbine is down for any reason.

Further, the modifications required to existing gas turbines to implement the present concepts can be performed during a scheduled major outage (e.g., an hours-based hot gas path ("HGP") inspection, a starts-based HGP inspection, a starts-based rotor maintenance interval, etc.), or an opportunistic HGP inspection, when the cylinders are apart already, thus minimizing cost. The machining of the surface (see FIG. 15) is a one-time cost per turbine. Once a system in accord with the present concepts is installed on a turbine, a dead air space baffle (if it fails) can be replaced in a matter of hours by one or two plant personnel (e.g., technicians, maintenance personnel, operators, etc.).

DESCRIPTION OF THE PREFERRED EMBODIMENT

Figure 1:
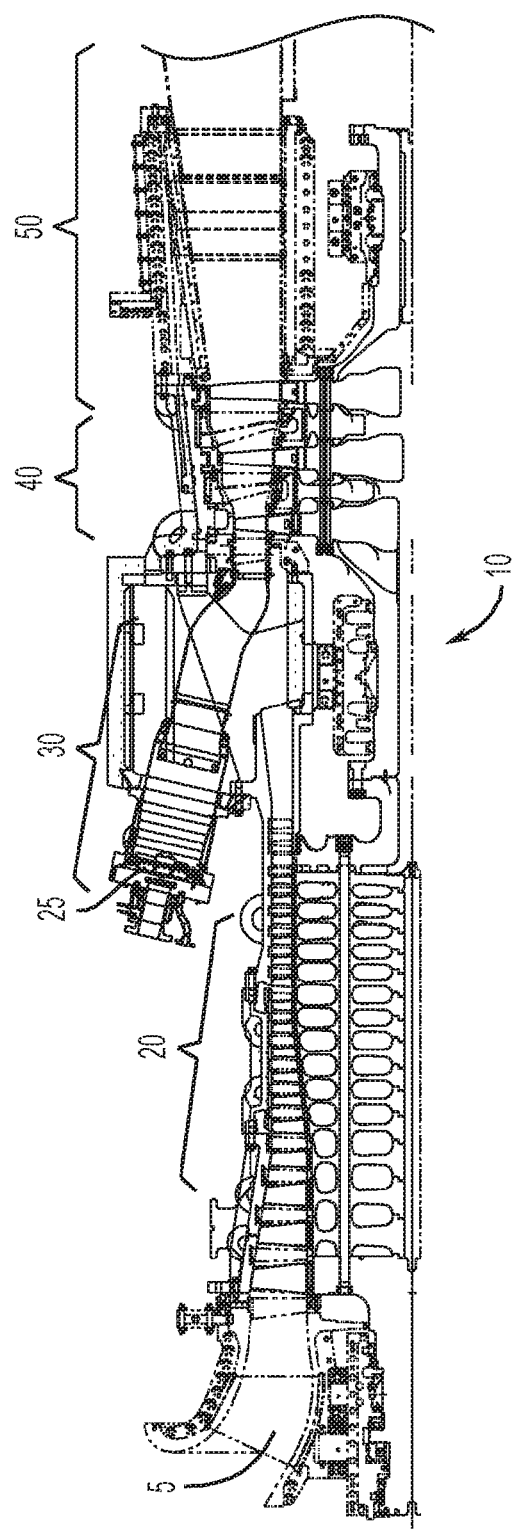
FIG. 1 is a longitudinal cross-sectional view of a conventional gas turbine.
Figure 2:
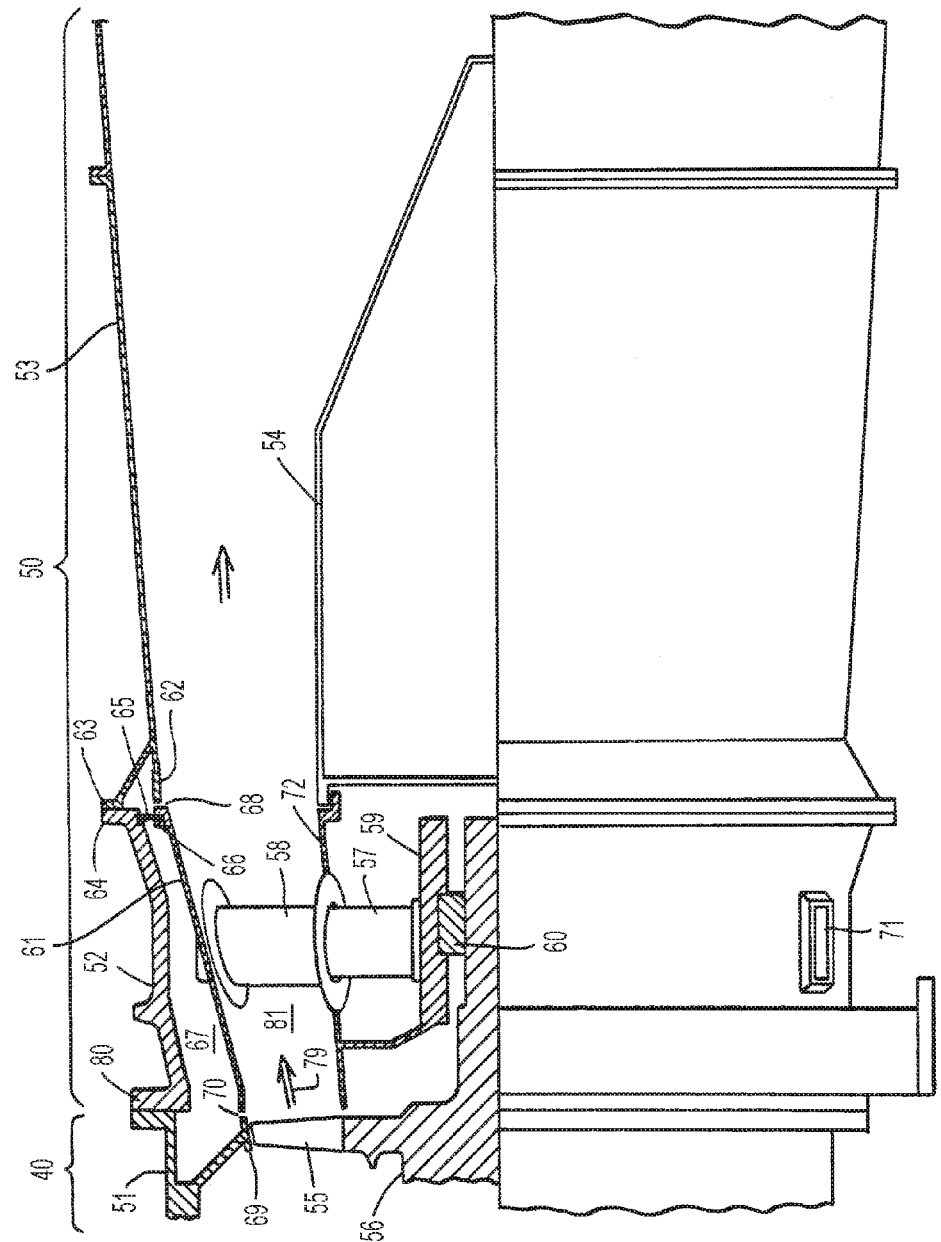
FIG. 2 is a partial cross-sectional view of an aft portion of a conventional gas turbine cylinder section and connected exhaust cylinder section.
Figure 3:
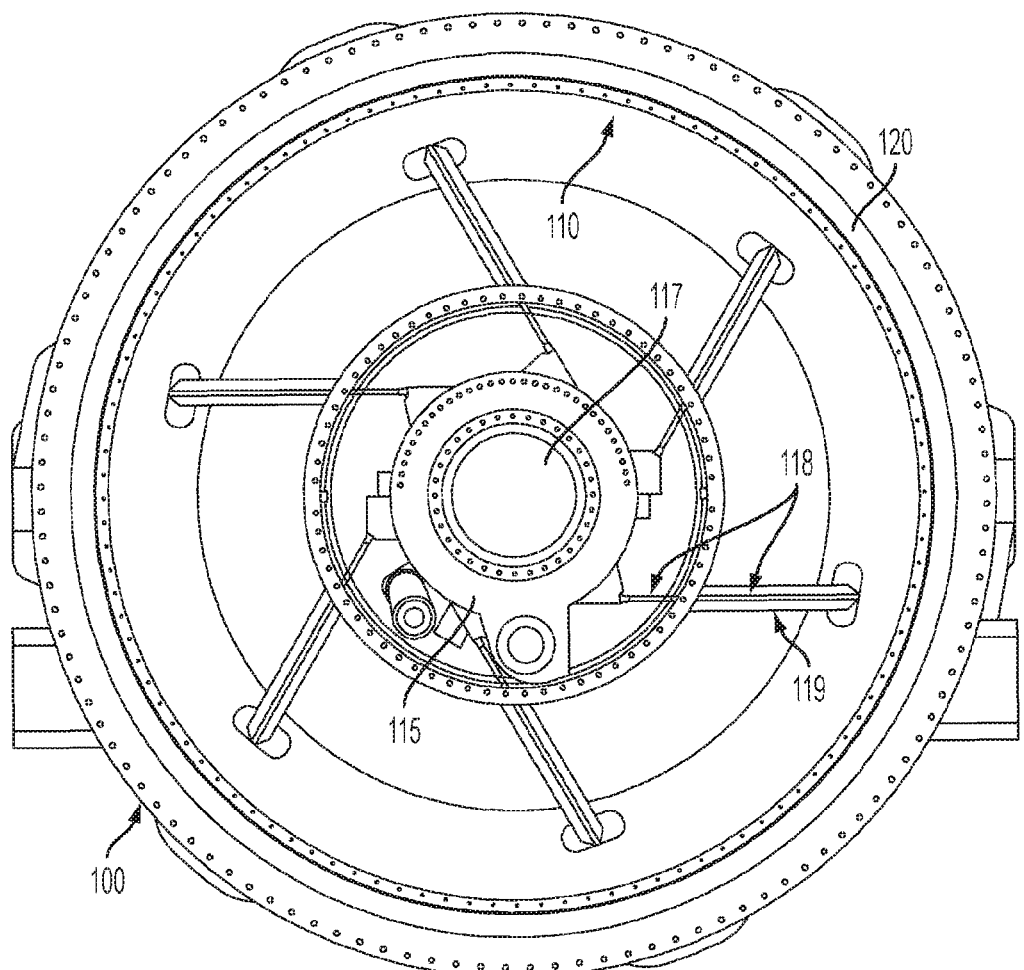
FIG. 3 is an aft view of a conventional gas turbine exhaust cylinder section.
Figure 4A:
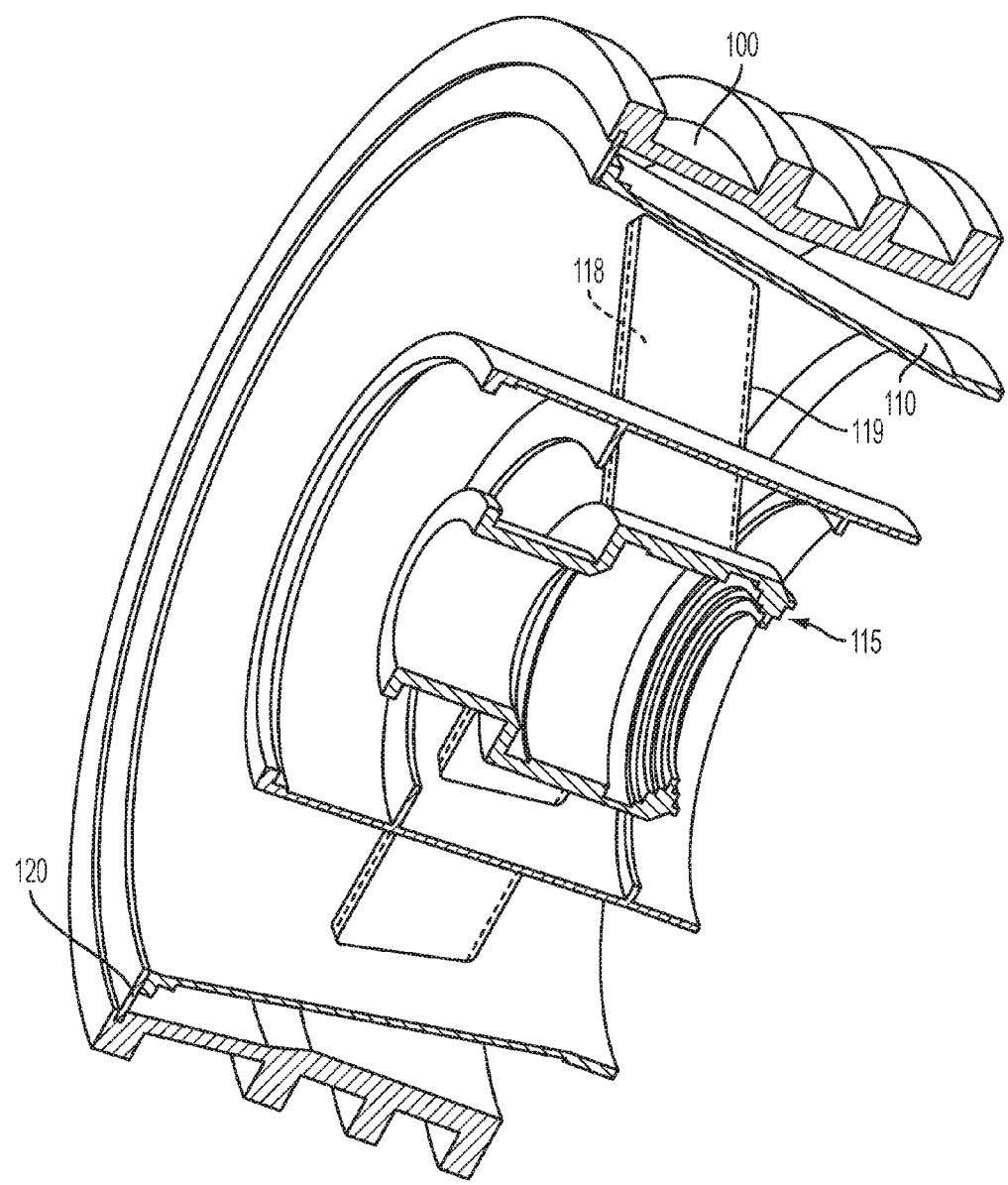
FIGS. 4A-4B are perspective and side views, respectively, of a conventional gas turbine exhaust cylinder section.
Figure 4B:
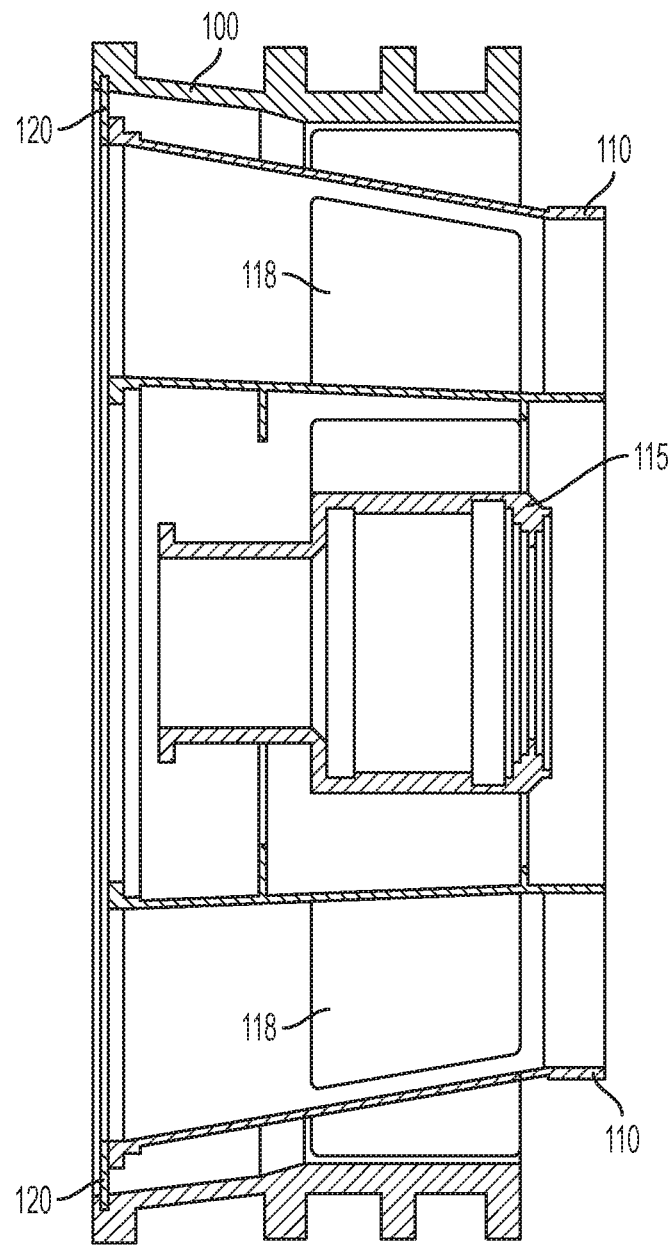
Figure 5:
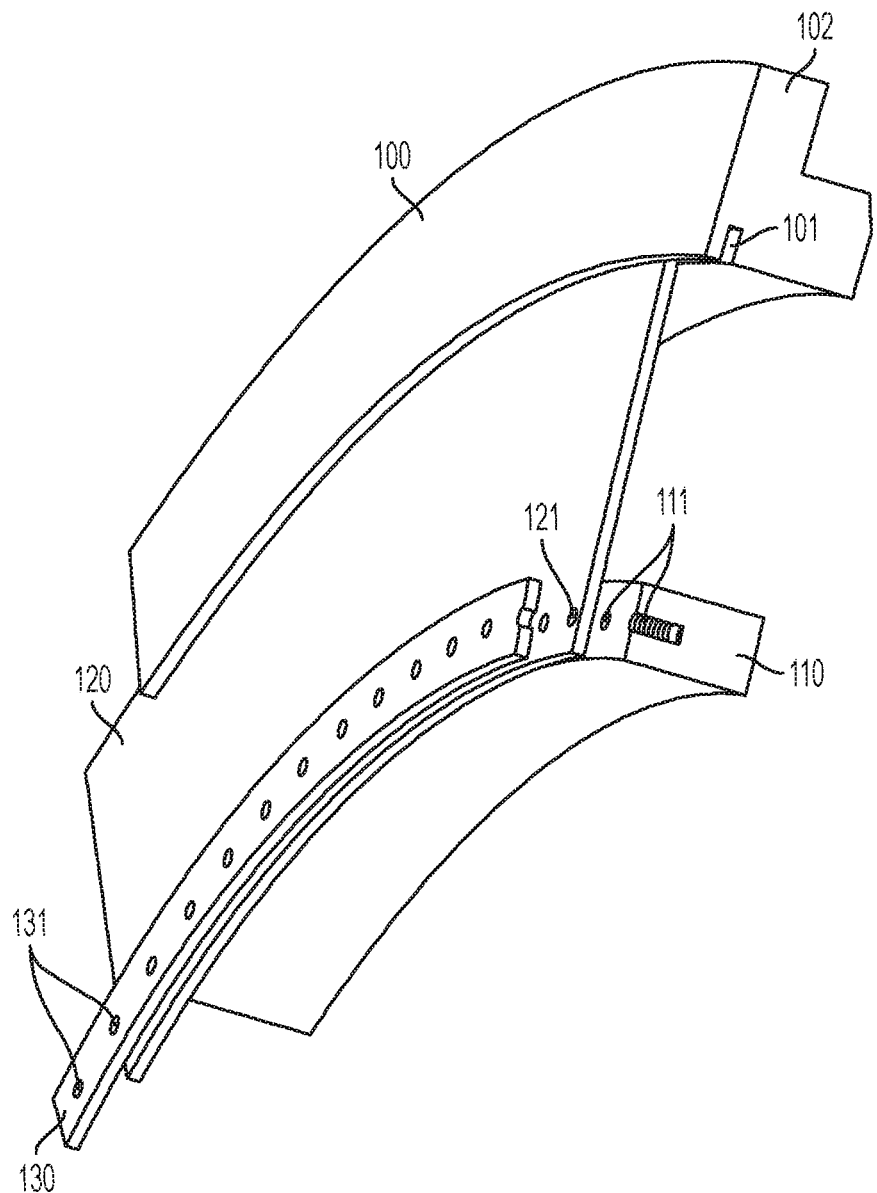
FIG. 5 is a perspective view of a portion of a prior-art gas turbine exhaust cylinder section showing the relation of the dead air space baffle plate to the diffuser shell and the exhaust cylinder.
Figure 6:
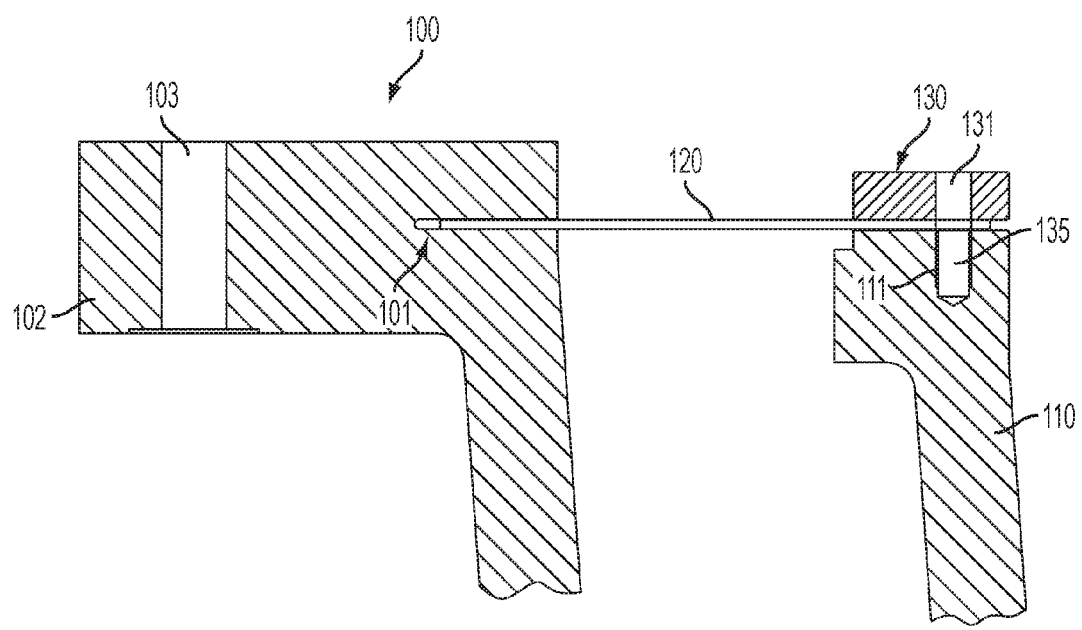
FIG. 6 is a cross-sectional view of the prior-art dead air space baffle plate seal of FIG. 5.

FIG. 6 is a cross-sectional view of a conventional dead air space baffle plate construction, such as is shown in the perspective view of FIG. 5. An inner diameter of the flange 102 of the exhaust cylinder 100 comprises a slot 101 dimensioned to receive a distal end of baffle plates 120 spaced apart circumferentially to occlude the space between the exhaust cylinder 100 and the diffuser shell 110. The baffle plates 120 extend perpendicularly inwardly from the flange 102 of the exhaust cylinder and abut against a port or front surface of the diffuser shell 110, as shown in FIG. 6. Conventional baffle plates 120 are made two stacked plates of HASTELLOY® X alloy, a nickel-chromium-iron-molybdenum alloy produced by Haynes International. Each of the two plates is roughly 0.042" thick, yielding an overall thickness of about 0.120". It is to be noted that the dimensions provided herein are guidelines and are not to be considered expressly limiting. In the field, variances in thicknesses may occur, component may settle, sag, bow, or deform slightly over time, and/or other environmental conditions and/or prior work may impact various component dimensions. For these reasons, and further in consideration of machining tolerances, the dimensions presented herein are merely presented as general reference guides, not absolutes.

A holding ring 130, formed of a Grade 304 stainless steel, is then disposed over the proximal end of the baffle plate and bolts 135 (M12×1.75 Hex Head Bolts) inserted through formed through-holes 131 in the holding ring, through-holes in the baffle plate, and a blind hole 111 in the diffuser shell 110. The blind hole 111 is tapped. In total, a conventional Westinghouse 501F gas turbine comprises a total of 12 holding ring segments 130, 12 baffle segments, and 4 bolts per holding ring segment and baffle segment (for a total of 48 bolts). As shown in FOG. 6, the exhaust cylinder 100 flange 102 comprises a through hole 103 adapted to receive a bolt joining and securing the exhaust cylinder to the turbine cylinder.

Figure 7:
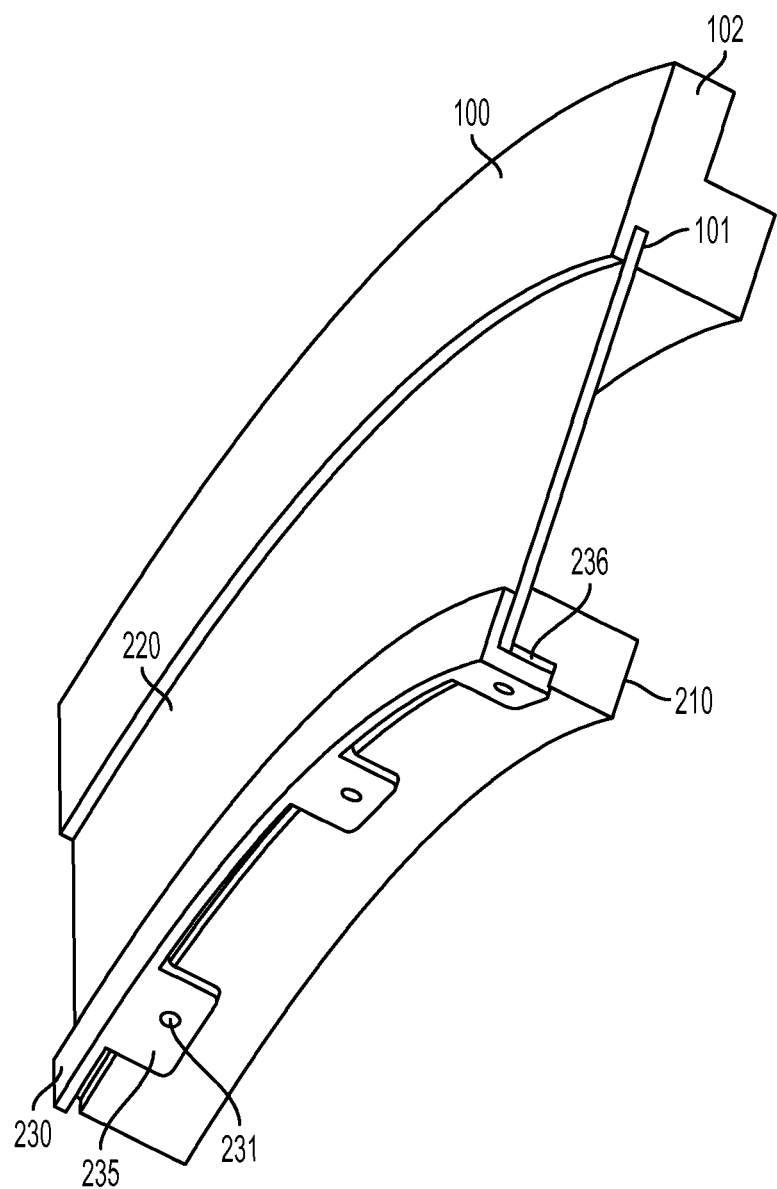
FIG. 7 is a perspective view of a portion of a gas turbine exhaust cylinder section showing a design for the dead air space baffle plate and diffuser shell in accord with at least some aspects of the present concepts.

FIG. 7 shows a perspective view of a design for a dead air space baffle plate and diffuser shell connection in accord with at least some aspects of the present concepts. In the aspect of the present concepts depicted in FIG. 7, a connection between a distal (outer) end of the baffle plate 220 and the slot 101 of the exhaust cylinder 100 flange 102 is the same as that of a conventional turbine dead air space baffle plate (see, e.g., FIG. 5). In contrast to the conventional design of FIG. 5, however, one or more of the proximal (inner) end of the baffle plate 220, the holding ring 230, and the diffuser shell 210 are modified in accord with the present concepts. As shown in FIG. 7, the general envelope of the baffle plate 220 remains largely unchanged, whereas the holding ring 230 is formed with a plurality of spaced-apart downwardly extending holding segments 235 having through holes 231 formed therein. These spaced-apart downwardly extending holding segments 235, discussed further below, are dimensioned to fit within corresponding recesses machined into the diffuser shell 210. In another aspect of the present concepts, the baffle plates 220 may themselves comprise a corresponding plurality of spaced-apart downwardly extending holding segments with through-holes concentrically arranged relative to the holding ring 230 downwardly extending holding segment 235 through holes 231. In yet another aspect of the present concepts, the baffle plates 220 may comprise a corresponding plurality of spaced-apart downwardly extending holding segments spaced apart from the holding ring 230 downwardly extending holding segments 235.

Figure 17:
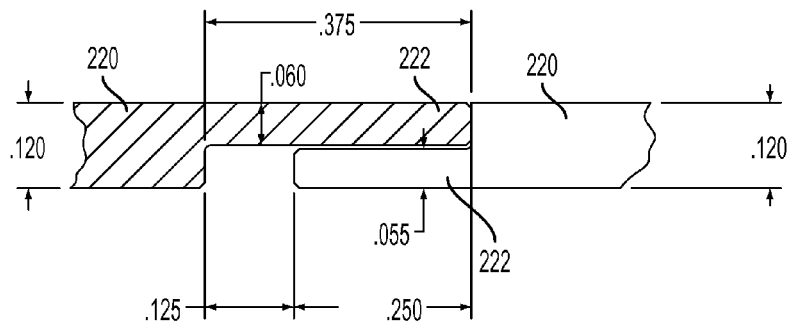
FIG. 17 is a cross-sectional view of the installed and overlapping dead air space baffle plates shown in FIG. 16 taken along cross-section 17-17.
Figure 19:
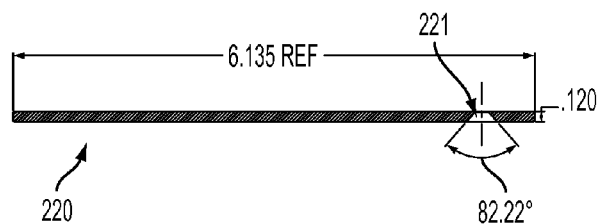
FIG. 19 is a cross-sectional view of a dead air space baffle plate shown in accord with at least some aspects of the present concepts.

Significantly, the present concepts permit, if desired, the reuse of existing conventional baffle plates 120 in combination with the holding ring 230 and modified diffuser shell 210, as discussed below in relation to FIGS. 17 and 19. Alternatively, the baffle plate 220 can comprise a plurality of plates of differing compositions such as a first approximately 0.040" thick plate of HASTELLOY® X alloy, a second approximately 0.040" thick plate of Haynes® 214® Alloy (or of Haynes® 230® Alloy or Haynes® 237® Alloy), produced by Haynes International, and a third plate of approximately 0.040" thick plate of HASTELLOY® X alloy, yielding an overall thickness of about 0.120". In still another aspect, the baffle plate 220 comprises a single baffle plate 220 of Haynes® 214®, 230®, of 237® Alloy having a thickness of about 0.120". In still another aspect, the baffle plate 220 comprises a first plate of Haynes® 214®, 230®, of 237® Alloy having a thickness of about 0.060" and a second plate of another of the Haynes® 214®, 230®, of 237® Alloy and/or HASTELLOY® X alloy. Other materials may providing exceptional resistance to oxidation and high-temperature strength may also be used in combination with, or in lieu of, any of the aforementioned materials. Significantly, since the present concepts disclose a system and method whereby baffle plates 220 may be quickly and inexpensively removed and replaced, the material selection criteria is effectively broadened as the required service life or run interval becomes somewhat less significant.

As the exhaust cylinder 100 slot 101 is generally about 0.130" across, the thickness of the baffle plate 220 should be less than about 0.115"-0.120". As another alternative, if a thicker baffle plate 220 is desired to be used, the exhaust cylinder 100 ID flange slot 101 can be machined accordingly to accommodate the baffle plates 220 of increased thickness or distal ends of the baffle plates 220 can be tapered or otherwise reduced in thickness sufficiently to permit insertion in and retention by the existing flange slot 101 while simultaneously permitting radial relative motion with respect thereto to accommodate thermal expansion and contraction.

Figure 8:
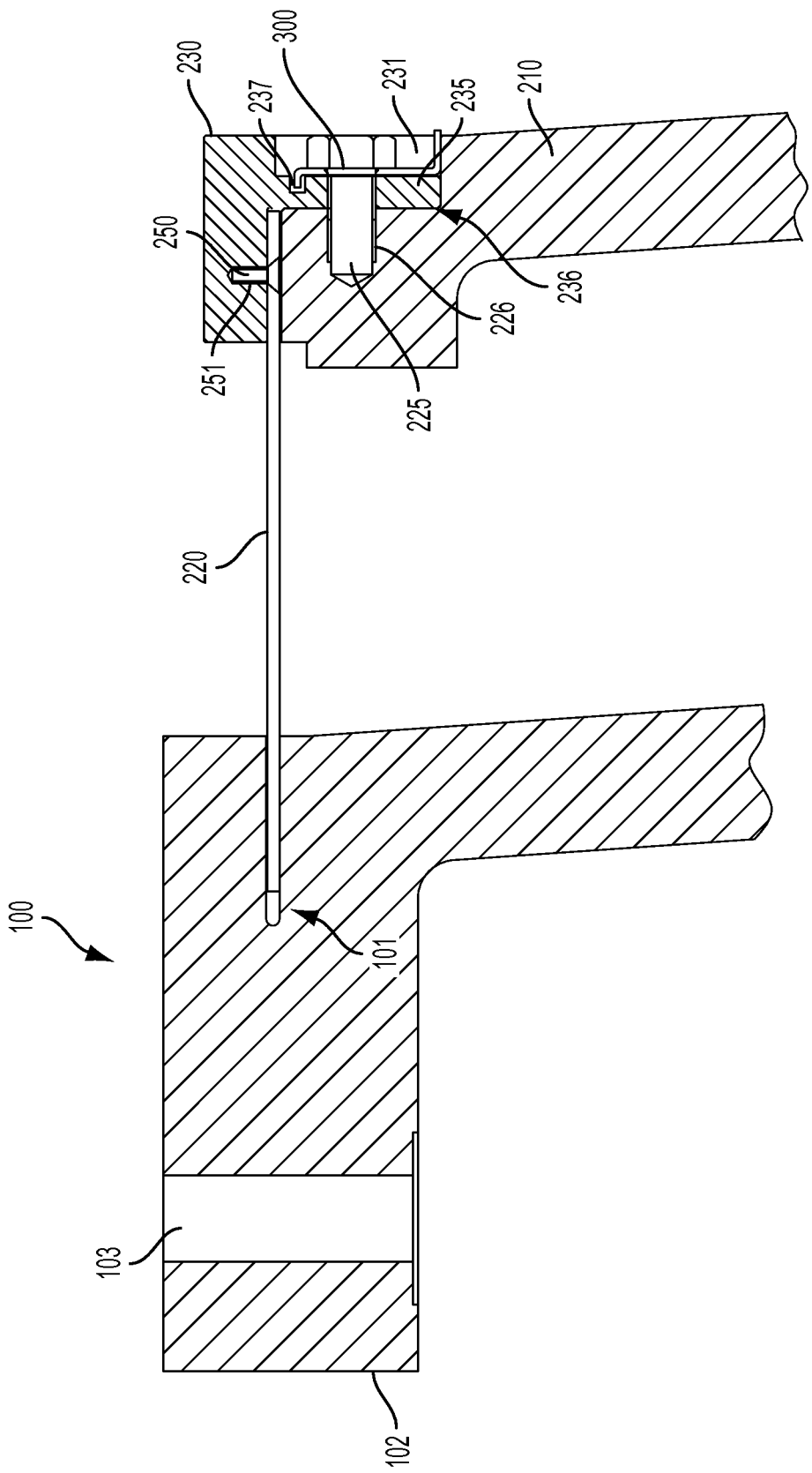
FIG. 8 is a cross-sectional view of the dead air space baffle plate seal of FIG. 7 in accord with at least some aspects of the present concepts.

FIG. 8 shows a cross-sectional view of the dead air space baffle plate 220, holding ring 230, diffuser shell 210, and exhaust cylinder 100 of FIG. 7. The cross-sectional view of FIG. 8 is taken through a center of one of the downwardly extending holding segments 235 and its through hole 231, as shown by the cross-sectional line 8-8 in FIG. 9.

Figure 15:
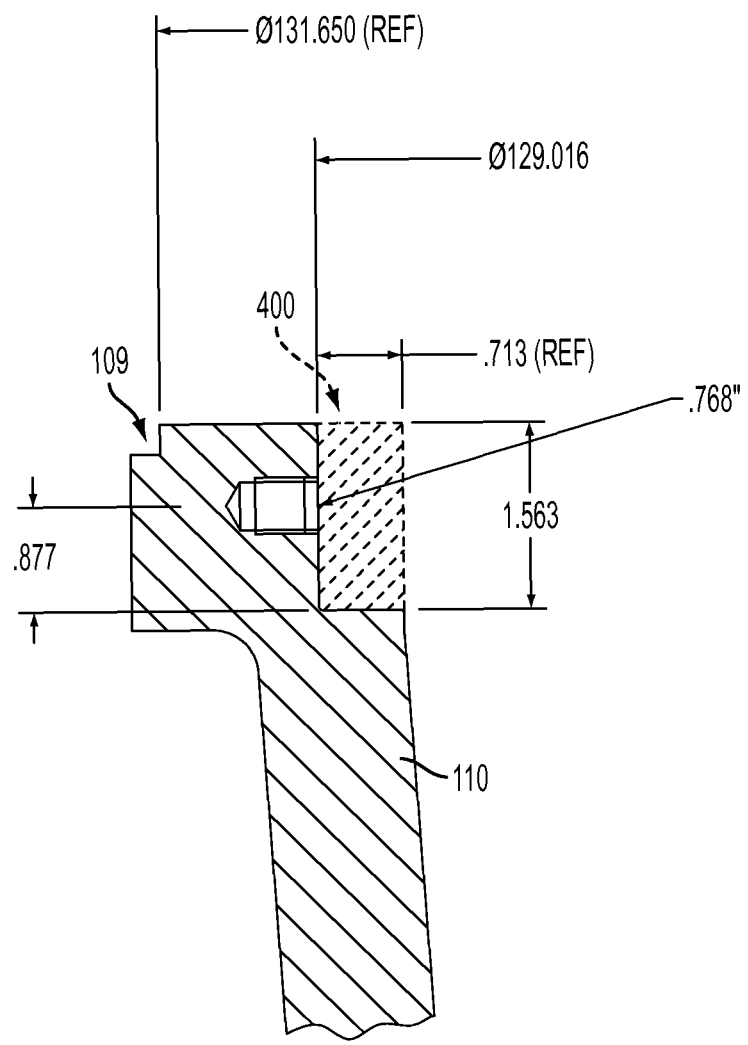
FIG. 15 is a cross-sectional view of machining required to be performed on a conventional diffuser shell to accommodate the dead air space baffle plate system in accord with at least some aspects of the present concepts.

To accommodate the holding ring 230 and provide an approximately flush boundary at the inner diameter of the diffuser shell to facilitate smooth gas flow at the inner diameter of the diffuser shell, portions of the diffuser shell 210 are machined to dimensions generally corresponding to, and slightly larger than, those of corresponding dimensions of the holding ring. FIG. 15 shows details of an example of such machining to the diffuser shell 210, which may be performed during manufacture of the diffuser shell or may be performed only one time during a gas turbine outage wherein the turbine section and exhaust section are separated from one another to provide access to the appropriate section of the diffuser shell.

For an existing diffuser shell 110 lacking formed holding segment 235 recesses 236, such as is represented in FIGS. 5-6, a portion of the ID of the diffuser shell 110 is removed by conventional machining processes to form holding segment recesses 236 to accommodate the holding segments 235. In general, the holding segment recesses 236 are dimensioned to correspond to the dimensions of the holding segments 235 to enable the holding segments to be received therein. The depicted shape of the holding ring 230 holding segments 235 is illustrative and is not intended to be limited in any way to the concepts presented herein. In this regard, it is to be further understood that a holding ring 230 in accord with the present concepts may comprise one or more holding segments 235 of any shape (e.g., square, rectangular, arcuate, semi-circular, etc) and/or size and that the holding segment recesses 236 would advantageously mirror that shape and/or size. As one example, a single rectangular holding segment 235 may span an entire proximal or inner end of the baffle plate to provide continuous contact with an inner diameter of the diffuser shell 210. As another example, two rectangular holding segments 235 could be provided with each of the holding segments spanning a quarter to a third of an arc length of a baffle plate 220. As still another example, the holding segment recesses 236 and holding segments 235 are semicircular in shape.

As shown in the example of FIG. 15, a generally rectangular section 400 of the inner diameter of the diffuser shell 210 is removed to form the holding segment recess 236 to correspond to the illustrated generally rectangular holding segments 235 depicted in, for example, FIG. 7. As noted above, however, where a holding segment 235 assumes a different shape, such as a semicircle, the removal of material from the diffuser shell to form the holding segment recesses 236 would correspondingly differ. The diffuser shell 210 inner diameter, as measured from the center of the axis of rotation of the gas turbine is generally about 127.590". However, this inner diameter dimension is not a reference dimension and, instead, the reference dimension for machining is provided by the notched section 109 shown in the upper left hand corner of FIG. 15. The back face or OD of the holding segment recess 236 is measured, in this example, as being about 2.634" (0131.650 (REF)-Ø129.016). In general, the depth "D" of the holding segment recess 236 is between about 0.50"-0.75". The height of the holding segment recess 236 is about 1.563". Optionally, but preferably, inner and outer edges of the holding segment recess 236 are radiused and/or chamfered (e.g., by ⅟₃₂" at 45°), as appropriate, to soften the edges of the holding segment recess 236.

As shown in FIG. 8 and FIG. 15, a bolt hole is formed in the holding segment recess 236 to enable a fastening member, such as bolt 225 in FIG. 8, to be used to secure a holding ring 230 holding segment 235 within the holding segment recess. In the example shown, a bolt hole having a depth of about 0.768" with a center line about 0.877" above the bottom of the holding segment recess 236 is tapped for an INCONEL® alloy X-750 or Haynes® X-750 alloy M12 Hex Head Bolt. In the example shown, a width of the holding segment recess 236 is at least 2.500" to accommodate the holding segment shown in FIG. 13. However, the fasteners 225, 250 utilized in accord with the present concepts herein may comprise any other suitable material and by way of example could comprise a HASTELLOY® X alloy, a Haynes® 214® Alloy, a Haynes® 230® Alloy, a Haynes® 237® Alloy, INCONEL® alloy 686, INCONEL® alloy 725, or other material.

Figure 12:
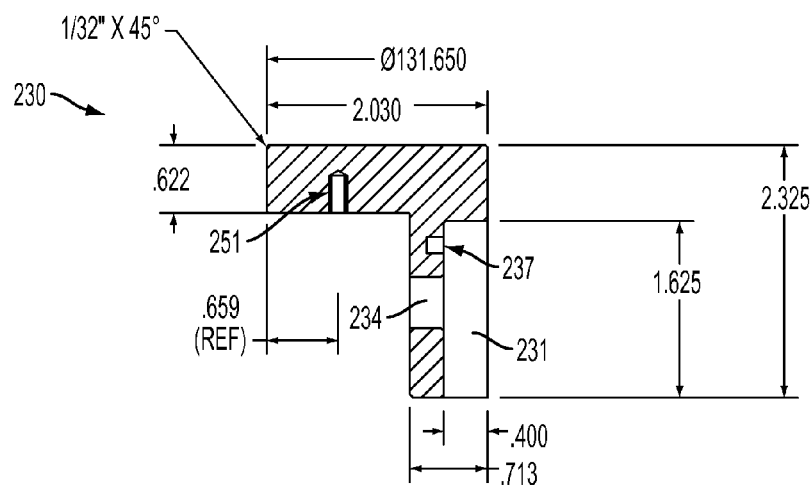
FIG. 12 is a cross-sectional view of the dead air space baffle holding ring of FIG. 10 taken along a center line of a holding segment.
Figure 13:
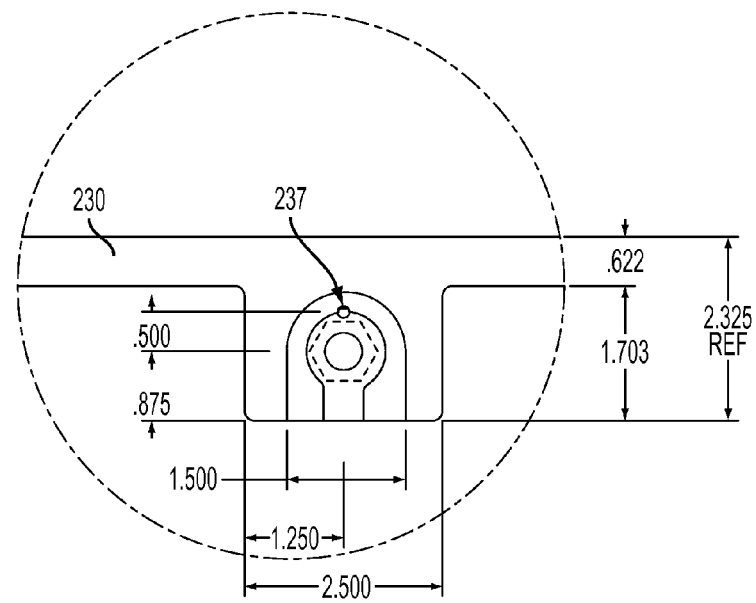
FIG. 13 is a front detail view of the dead air space baffle holding ring of FIGS. 10-12 showing details of a holding segment recess in accord with at least some aspects of the present concepts.
Figure 14:
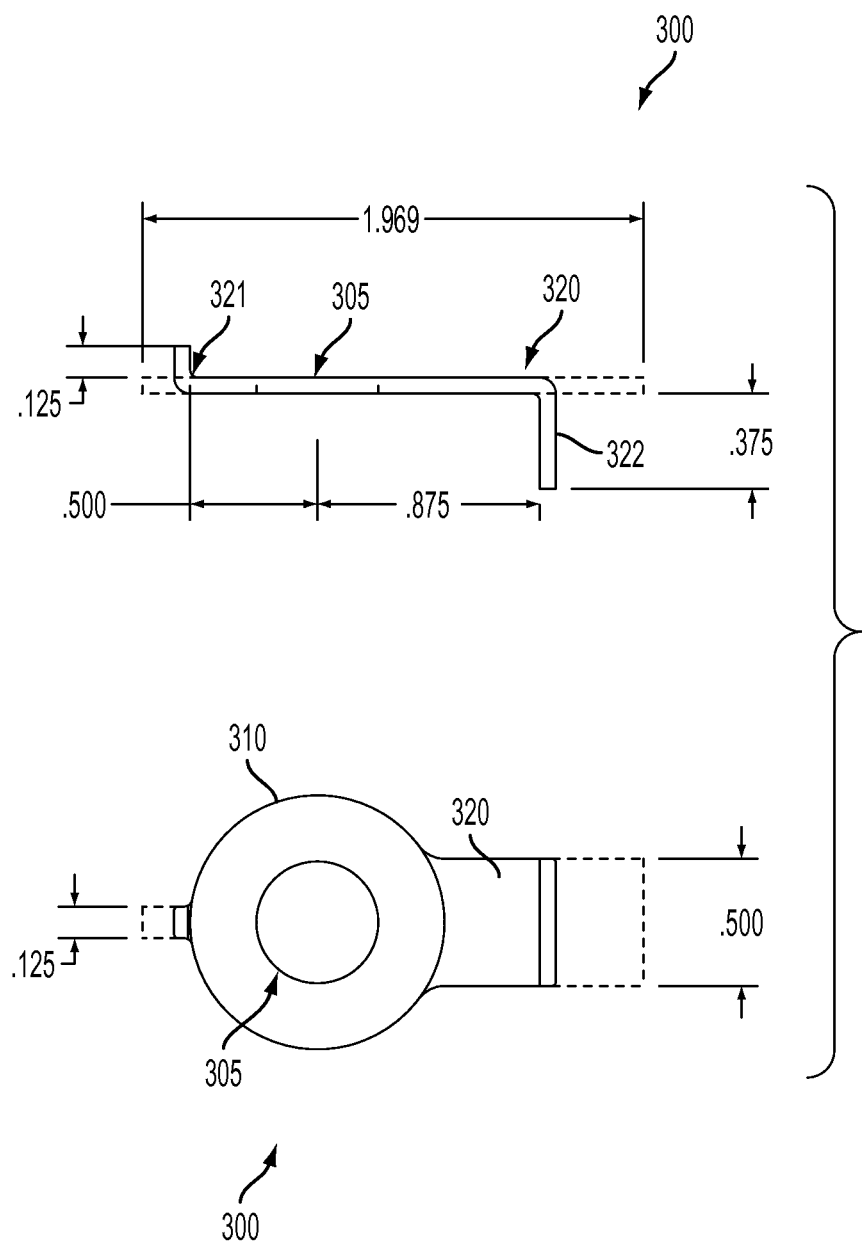
FIG. 14 shows a side and top detail view of a locking tab, in accord with at least some aspects of the present concepts, for the holding segment of the dead air space baffle holding ring of FIGS. 10-13.

As shown in FIG. 8 and FIGS. 12-13, the holding segment 235 defines a locking recess 231 dimensioned to accept the fastening member 225 through opening 234 and dimensioned to accommodate the fastening member head (e.g., a bolt head of the noted example of a M12 Hex Head Bolt) and a corresponding locking tab 300, such as is shown by way of example in FIG. 14, configured to lock the bolt in place and prevent vibration-induced and/or thermally-induced loosening (i.e., "backing out") of the fastening member 225.

In the example shown in FIG. 13, the height of the holding ring 230 from the upper surface to the bottom of the holding segment 235 is about 2.325". A thickness of the upper web of the holding ring 230 is about 0.622" in the illustrated embodiment. The radius of the upper, circular portion of the locking recess 231 is about 0.750" and the height of the locking recess, from the bottom of the holding segment 235 to the top center point of the locking recess is about 1.700" in the illustrated embodiment. To facilitate retention of and functioning of the locking tab 300, a locking tab recess 237 is formed into the holding segment 235 to accommodate a locking tab 321 centered about the screw hole 234. In one aspect, the locking tab recess 237 may comprise a drilled hole, such as a Ø0.150×³⁄₁₆" hole, although any recess dimensioned to receive a correspondingly dimensioned locking tab may be formed in accord with the present concepts using conventional tooling.

Locking tab 300, dimensioned for insertion in the locking tab recess 237, is shown in FIG. 14. The embodiment of the locking tab 300 shown in FIG. 14 includes a generally circular head portion 310 having a 0.480" diameter hole 305 centrally formed therein, corresponding in diameter to the indicated M12 Hex Head Bolt (having a maximum body diameter of about 0.472"). An outer diameter of the head portion 310 is roughly 1.00" in diameter. A tab 321, shown in FIG. 14, extends from a top end of the head portion 310 radially outwardly in the installed position, as shown in FIG. 8. A square or rectangular tail portion 320, shown in FIG. 14, extends outwardly from the head portion 310 and comprises at a distal portion thereof a tab 322 extending radially inwardly in the installed position, as shown in FIG. 8. Other conventional locking means suitable for high temperature use may be used such as, but not limited to, split cotter pins, tab washers, lock washers, locking plates, a Dyna-Thred II® fastener or Omni-Lok™ fastener from Long-Lok Fasteners Corp., a MIL-F-8961 spec self-locking fastener, etcetera.

Figure 16:
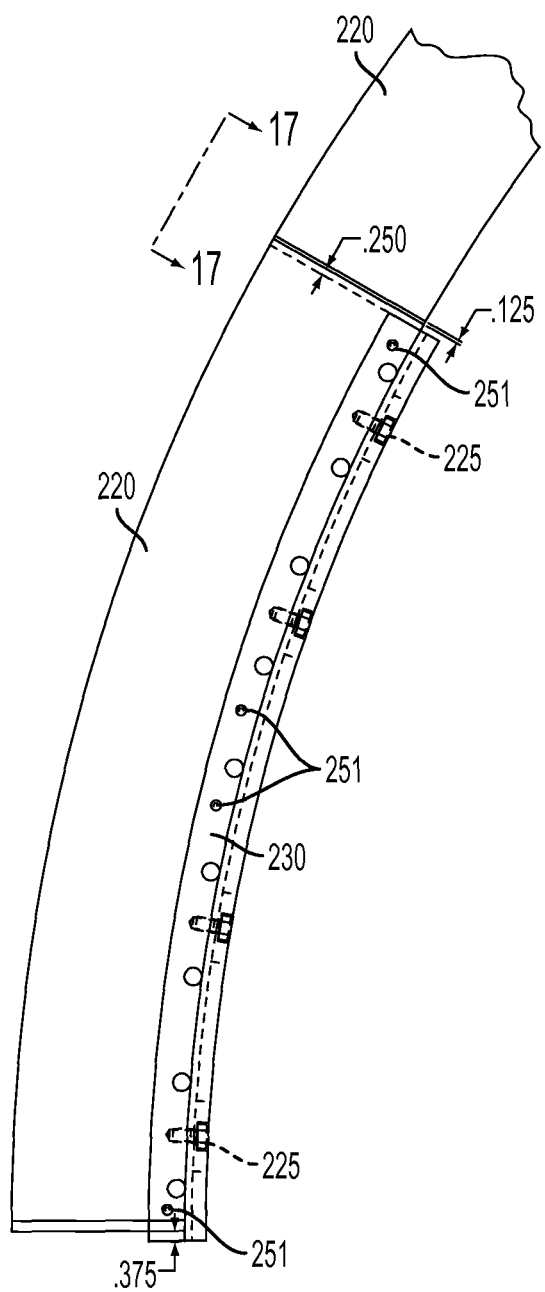
FIG. 16 is a top view of installed dead air space baffle plates, with the holding ring securing the dead air space baffle plates to the diffuser shell in accord with at least some aspects of the present concepts, wherein the dead air space baffle plates are shown to overlap.

FIG. 8 also shows that the baffle plate 220 is attached to the holding ring 230 via fastening device 250 (e.g., a screw or bolt, etc.) disposed in tapped blind opening 251. In one aspect, the fastening device 250 comprises 312 Grade stainless steel No. 8×½" C'Sink cap screws. In the non-limiting embodiment disclosed in the accompanying figures, 48 such fastening devices 250 are provided to secure 12 baffle plate 220 segments to a corresponding number of holding ring 230 segments (i.e., 4 fastening devices per baffle plate and holding ring, such as shown in FIG. 16.

Significantly, this construction permits pre-assembly of the baffle plates 220 to the holding rings 230 even prior to entry into the exhaust cylinder section by workers tasked to replace dead air space baffle plates. Workers can pre-assemble baffle plates 220 and holding rings 230 by screwing the baffle plates 220 into the holding rings 230 using fastening devices 250 (e.g., screws, bolts, etc.). Following entry to the exhaust cylinder section (e.g., via a manway, such as a HRSG manway, etc.), the workers can remove one or more damaged holding ring 230 and baffle plate 220 segments and insert therefor a pre-assembled new holding ring 230 and baffle plate 220 segment by screwing the holding rings in place using bolts 225 and locking tabs 300. Alternatively, of course, assembly of a replacement holding ring 230 and baffle plate 220 could be performed in-situ and/or one or more existing holding ring(s) 230 reused in combination with replacement baffle plates 220 and/or, although less likely, one or more existing baffle plates 220 reused in combination with replacement holding ring(s) 230.

Figure 9:
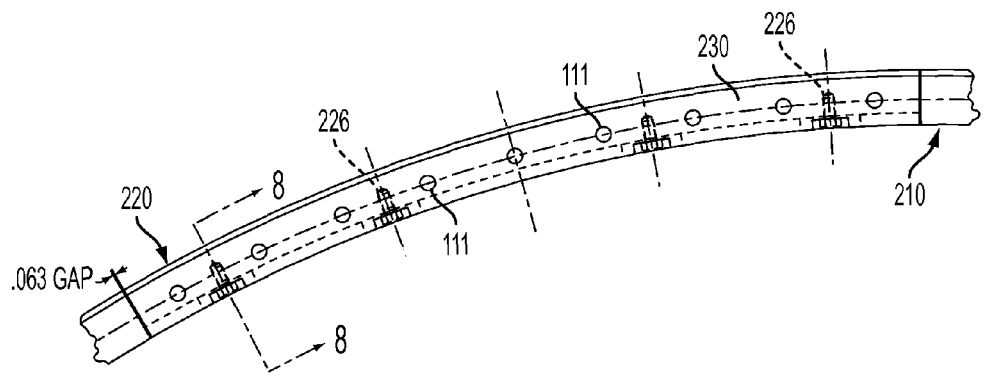
FIG. 9 is a top view of a portion of a dead air space baffle holding ring disposed on a modified diffuser shell in accord with at least some aspects of the present concepts.

FIG. 9 is a top view of a portion of a dead air space baffle holding ring 230 in accord with at least some aspects of the present concepts disposed on a modified diffuser shell 210. The view of FIG. 8 is taken along the cross-section 8-8 in FIG. 9. From this top view, the spaced apart tapped holes 226 for bolts 225 can be seen. In the example of FIG. 9, space-apart tapped holes 111 in the diffuser shell 110 are also shown, as such existing holes were used in the conventional baffle plate and holding ring connection (e.g., for the configuration shown in FIGS. 5-6). In accord with the present concepts, however, those tapped holes 111 are not needed. To the contrary, as noted above, the baffle plates 220 are connected directly to the holding ring 230 via fasteners 250 (e.g., screws, bolts, etc.) and the holding ring is connected to the modified diffuser shell 220. This connection between the holding right 230 and the baffle plate 220 permits the holding ring to be disconnected from the (modified) diffuser shell 210 without moving the diffuser shell away from the turbine cylinder. The holding right 230 and baffle plate 220 assembly can then be translated radially inwardly (into the diffuser section) and removed. Likewise, a new baffle plate 220 and/or holding ring 230 may be connected and then, in turn, connected to the (modified) diffuser shell 210 without moving the diffuser shell away from the turbine cylinder. At the left of the holding ring 230 in FIG. 9 is shown a gap of about 0.063" between adjacent holding ring segments. In at least some aspects of the present concepts, the edges of the holding rings 230 are formed or machined to have overlapping segments. In other aspects of the present concepts, end portions of adjacent holding rings are slightly spaced apart (e.g., such as but not limited to the indicated 0.063" in FIG. 9), rather than abutting, to accommodate thermal expansion.

Figure 10:
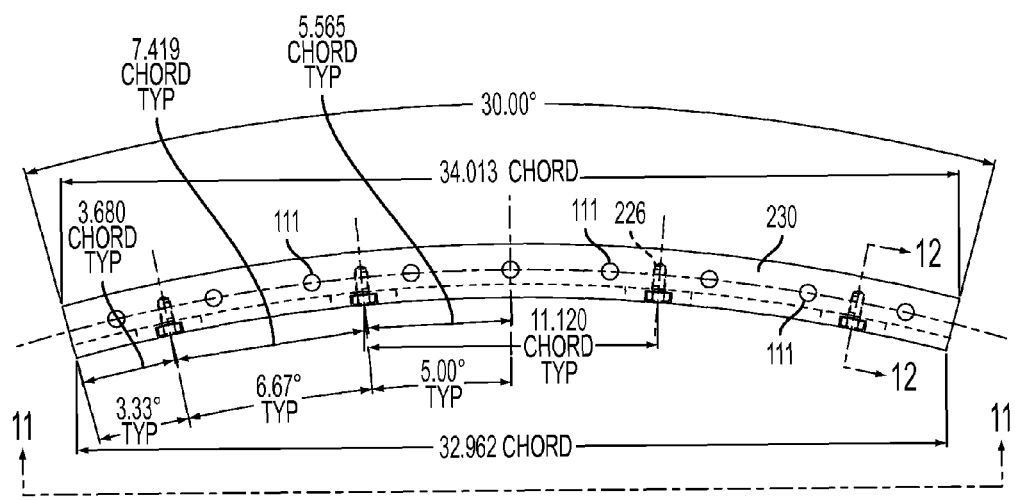
FIG. 10 is another top view of a portion of a dead air space baffle holding ring in accord with at least some aspects of the present concepts.

FIG. 10 is another top view of a portion of the dead air space baffle holding ring 230 disposed on a modified diffuser shell 210, as shown in FIG. 9. In FIG. 10, some exemplary, but non-limiting, dimensions are illustrated. Of note, the tapped holes 226 for the holding ring fasteners 225 are spaced apart and formed in between (e.g., centered, off-center, etc.) the existing tapped holes 111 in the diffuser shell.

Figure 11:
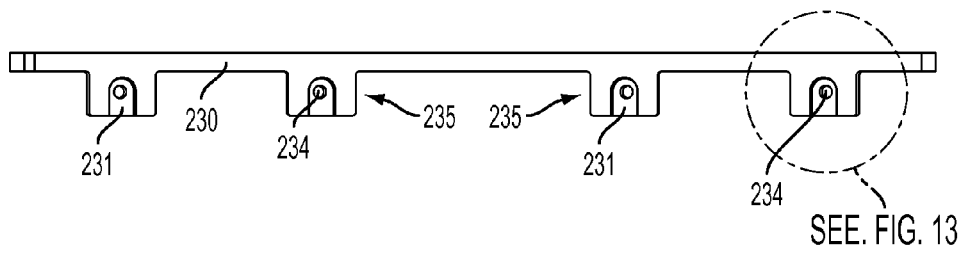
FIG. 11 is a front view of the portion of the dead air space baffle holding ring of FIG. 10.

FIG. 11 is a front view of the portion of the dead air space baffle holding ring of FIG. 10 as viewed along sectional line 11-11 in FIG. 10. Further to the simplified perspective depiction of the holding ring 230 in FIG. 7, FIG. 11 shows additional detail of the holding segment 235 locking recesses 231 and fastener openings 234, described hereinafter in relation to FIGS. 12-13. The holding segment 235 and fastener openings 234 are formed and positioned to align with the tapped holes 226 formed in the diffuser shell 210.

FIG. 12 is a cross-sectional view of the dead air space baffle holding ring of FIG. 10 taken along a center line of a holding segment, as represented by cross-sectional line 12-12 in FIG. 10. FIG. 12, further to the cross-sectional view of FIG. 8, shows additional detail of the holding ring 230. As previously noted, the dimensions indicated are not to be viewed as limiting and are merely exemplary. Clearly shown are the locking recess 231, upper locking tab recess 237, and tapped blind opening 251 used to connect the baffle plate 220 to the holding ring 230 via fastener 250 (not shown in FIG. 12). In FIG. 12, the center axis of the fastener opening 234 is shown to be about 0.875" from the bottom edge of the holding ring segment 235 and the fastener opening has a diameter of about 0.472". The upper locking tab recess 237 comprises, as shown, a drilled opening having a diameter of about 0.150" and a depth of about 3/16". The depth of the locking recess 231 is about 0.400", which is sufficient to accommodate therein the head of the fastener 225 inserted through fastener opening 234. As shown in the example of FIG. 12, the overall height of the holding ring 230 (in the depicted orientation) is about 2.325", the overall depth is about 2.030", and the height of the holding ring segment 235 is about 1.625".

FIG. 13 is a front detail view of the dead air space baffle holding ring of FIGS. 10-12 showing yet further details of a holding segment recess 231 in accord with at least some aspects of the present concepts. As previously described, the holding segment 235 defines a locking recess 231 dimensioned to accept a fastening member 225 and a corresponding locking tab 300. The locking recess 231 may be dimensioned different were another fastening member 225 and/or locking tab 300 combination to be used. As also discussed above, FIG. 14 shows a side view and top detail view of a locking tab 300 in accord with at least some aspects of the present concepts.

FIG. 15, discussed above, is a cross-sectional view of machining required to be performed on a conventional diffuser shell 110 (FIGS. 5-6) to accommodate the dead air space baffle plate system 230 in accord with at least some aspects of the present concepts. In association with the installation of the baffle plate 220 and holding ring 230 system described by way of example herein, it is expected that the machining and installation of the system will take 3-4 workers about 3-4 days (up to 7 days) to complete as a part of a Hot Gas Path (HGP) or Major Inspection (MI) where all of the vendors will already be on site with the requisite equipment (e.g., scaffold, insulators, crane, etc.). The first step is to remove, destructively if necessary, the old bolts 135 (see FIG. 6) and baffles 120, or remainder thereof. Next, a machining fixture is mounted to the diffuser shell 110 and a groove corresponding to that depicted in FIG. 15 machined into the ID of the diffuser shell flange. An additional machining fixture is used to drill new tapped holes 226 (e.g., installation of Heli-Coil®, etc.) to receive fastening members 225. Following this preparation of the diffuser shell 100, the baffles 220 can be attached to the new holding rings 230 and the holding rings then attached to the diffuser shell 100 via the holding ring segments 235 and fastening members 225 fastened into the tapped holes 226. Subsequently, as part of the normal HGP or MI procedure, the turbine cylinder section and exhaust cylinder section would be repositioned, aligned and doweled, followed by re-insulating, instrumenting, re-installing of roof panels and the like, as well as removal of scaffolding and general demobilization and clean-up.

Following this initial installation of the baffle plate 220 and holding ring 230 system described by way of example herein, it is expected that the replacement of one or more baffle plates 220 would take 1-2 workers only a few hours to complete and would cost only a small fraction of the current cost required to replace one or more baffle plates. Further, rather than waiting for an HGP or MI, the work can be performed during any opportunistic out-of-service time (e.g., over a weekend economic shutdown, etc.). Given the rapidness with which the baffle plates 220 disclosed herein can be removed and installed, one to two on-site mechanics, operators, or other staff, can simply access the inside of the diffuser shell (e.g., via a manway), loosen and remove the fastening members 225 on the subject holding ring(s) 230 corresponding to the baffle plate(s) 220 that require replacement, install the new baffle plate(s), fasten the fastening members 225, and exit with all parts and equipment.

The above procedure, under the present concepts, is to be contrasted with the current procedure for replacement of baffle plates (e.g., 120 in FIG. 5), which takes 8 workers about 12 days to complete, with a cost of parts and labor exceeding about $200,000 (excluding the balance of the cost of the adjunct HGP or Major inspection). The baffle plate replacement cannot simply be performed opportunistically; instead, an outage must be scheduled and all vendors and service-providers scheduled and temporally lined-up to provide the services at the requisite times (e.g., crane, scaffold, insulation, etc.). Only after this is done can the gas turbine be shut down and cooled down (assuming that the outage is not a forced-outage) following removal of insulation pads and instrumentation. Scaffolding is then built around the work area, roof vent fans moved, and at least two roof panels removed using the crane. The crew then unbolts all the bolting (circumferentially) around the exhaust case and turbine case and jacks and cribbing placed to support the exhaust cylinder when it becomes loose. The crane is then used to move the upper half of the exhaust cylinder off the machine. Only then can bolts 135 holding the baffle plates 120 in place be accessed and removed. Frequently, more than about 90% of the bolts 135 cannot be naturally removed and require destructive removal. The necessity to destructively remove most of the bolts consumes a significant amount of time and several days may be devoted to simply cutting out or drilling out bolts on both halves of the exhaust cylinder. The holes then need to be tapped out to ensure the threads are clean and only then can new baffles be attached to the diffuser shell using new bolts 135. Following this, a dowling contractor must re-dowel both halves of the exhaust cylinder to the turbine cylinder. Once the lower half is bolted up (every other bolt) an alignment specialist will take several days to re-align the cases, following which the balance of the restoration steps can be taken to restore the turbine to service.

FIG. 16 is a top view of adjacent dead air space baffle plates 220, with one illustrated holding ring 230 securing one of the dead air space baffle plates to the diffuser shell 210 in accord with at least some aspects of the present concepts, with the adjacent dead air space baffle plates being disposed to overlap along adjacent edges. The gap indicated by cross-section lines 17-17 is shown in detail in FIG. 17. In this embodiment, the baffle plates 220 each have a flange 222 at either end, with the flange being disposed on the top half of the baffle plate on one end (e.g., as shown in the left baffle plate in FIG. 17) and the flange being disposed on the bottom half of the baffle plate at the other end (e.g., as shown in the right baffle plate in FIG. 17). In this way, adjoining baffle plate flanges 222 can be oriented to overlap, such as is shown by way of example. In the example of FIGS. 16-17, the actual overlap is about 0.250", although the length of the upper baffle plate flange 222 is shown to extend beyond this overlap to create a gap of about 0.125".

Figure 18:
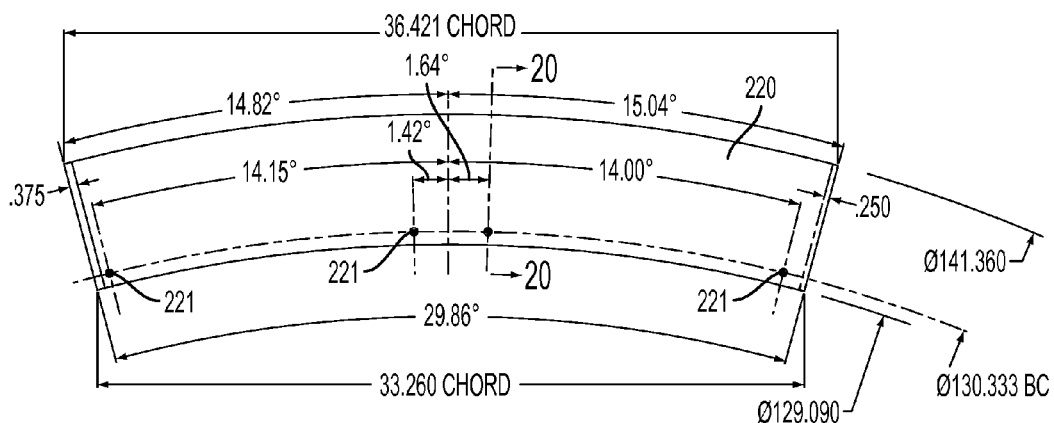
FIG. 18 is a top view of a dead air space baffle plate in accord with at least some aspects of the present concepts.

FIG. 18 shows a top view of a dead air space baffle plate 220 in accord with at least some aspects of the present concepts. FIG. 18 particularly shows the through holes 221 in the baffle plates 220 that correspond in placement to the tapped blind openings 251 in the underside of the upper web of the holding ring 230 so that fastening members 250 inserted through the through holes 221 align with the tapped blind openings 251 of the holding ring 230 to permit securement therebetween. As is shown in the cross sectional view of FIG. 19, the through hole 221 is desirably, but not necessarily, countersunk, such as at an angle of between 60°-120°, with an illustrated example of 82.22°. In another example, a counterbore is provided.

Although the present concepts have been disclosed in relation to the dead air space baffle plate 220 sealing the annular space between the exhaust cylinder 100 and (modified) diffuser shell 210 adjacent the turbine cylinder, it will be clear to those of ordinary skill in the art that the modifications and seal disclosed herein can be used in other sections of the gas turbine, as well as in other makes and models of gas turbines, to facilitate maintenance and reduce both short-term and long-term cost.

The foregoing disclosure has been presented for purposes of illustration and description. The foregoing description is not intended to limit the present concepts to the forms, features, configurations, modules, or applications described herein by way of example. Other non-enumerated configurations, combinations, and/or sub-combinations of such forms, features, configurations, modules, and/or applications are considered to lie within the scope of the disclosed concepts. Merely by way of illustration, as disclosed in the examples herein, a single holding ring 230 was described to hold a single baffle plate 220. In another variant in accord with the present concepts, a single holding ring 230 may be configured to hold a plurality of baffle plates 220. In still another variant in accord with the present concepts, a plurality of holding rings 230 may be configured to hold a single baffle plates 220 (e.g., the holding ring 230 shown in FIG. 16 could be bisected between the tapped blind openings 251).

In addition, or alternatively, an arc defined by the arcuate baffle plates may be uniform (e.g., 10 baffle plates each defining an arc of about 36°) or dissimilar (e.g., 8 baffle plates each defining an arc of about 36° and 4 baffle plates each defining an arc of about 18°) in different sections of the diffuser shell. Moreover, although the example of FIG. 18 shows an arc of the baffle plate 220 to be about 29.86°, the baffle plates 220 may define a different (greater or lesser) arc.

In a further modification to the present concepts, any of the component parts disclosed herein, such as but not limited to the baffle plates 230, holding rings 230, holding ring segments 235, and/or fasteners 225, 250, can advantageously be provided, in whole or in part (e.g., a portion of a surface, an entire surface, multiple surfaces, etc.) with a coating to achieve a desired effect. By way of example, in at least some aspects, a distal portion of the baffle plates 220 (e.g., the last full inch on both sides) are coated with 4-6 mils of MCrAlY (where M=Co, Ni or Co/Ni) to act as a wear guard to prevent metal fretting and provide abrasion resistance.

We claim:

1. A method of replacing a baffle plate extending in a radial direction between an exhaust cylinder and a diffuser shell of a gas turbine, the gas turbine having a turbine cylinder attached to the exhaust cylinder, the method comprising the acts of:
- unfastening and removing baffle-plate-holding-ring fastening members from one or more baffle-plate holding rings attached to the diffuser shell via the baffle-plate-holding-ring fastening members, the unfastening occurring in the radial direction relative to a longitudinal axis of the gas turbine;
- removing the one or more baffle-plate holding rings corresponding to the removed baffle-plate-holding-ring fastening members; and
- removing the baffle plate corresponding to the one or more removed baffle-plate holding rings, the act of removing the baffle plate comprising disengaging a distal end of the baffle plate from an inner circumferential slot of the exhaust cylinder by pulling the baffle plate radially inwardly from within the diffuser shell,
- wherein the acts of unfastening and each of the acts of removing are performed while the exhaust cylinder is attached to the turbine cylinder.

2. The method of claim 1, further comprising the acts of:
- inserting a replacement baffle plate corresponding to the removed baffle plate;
- inserting the one or more baffle-plate holding rings corresponding to the removed one or more baffle-plate holding rings;
- inserting the baffle-plate-holding-ring fastening members, in the radial direction, into the one or more baffle-plate holding rings to attach the one or more baffle-plate holding rings to the diffuser shell; and
- fastening the baffle-plate-holding-ring fastening members to secure in place the one or more baffle-plate holding rings and the replacement baffle plate,
- wherein each of the acts of inserting and the act of fastening, are performed while the exhaust cylinder is attached to the turbine cylinder.

3. The method of claim 2, wherein the entire method is performed by one person or by a two-person crew.

4. The method of claim 3, wherein the entire method is performed in a period of less than 6 hours.

5. The method of claim 2, wherein the entire method is performed in a period of less than 6 hours.

6. The method of claim 2, wherein the entire method is performed by one person.

7. A method of replacing a baffle plate extending in a radial direction between an exhaust cylinder and a diffuser shell of a gas turbine, the gas turbine having a turbine cylinder attached to the exhaust cylinder, the method comprising the acts of:
- unfastening and removing fastening members from a holding ring attached to the diffuser shell via the fastening members, the unfastening occurring in the radial direction relative to a longitudinal axis of the gas turbine, the holding ring being directly attached to the baffle plate;
- removing the holding ring and the baffle plate simultaneously, the act of removing the holding ring and the baffle plate simultaneously comprising disengaging a distal end of the baffle plate from an inner circumferential slot of the exhaust cylinder by pulling the baffle plate radially inwardly from within the diffuser shell,
- wherein the acts of unfastening and each of the acts of removing are performed while the exhaust cylinder is attached to the turbine cylinder.

8. The method of claim 7, wherein the entire method is performed by one person or by a two-person crew.

9. The method of claim 8, wherein the entire method is performed in a period of less than 6 hours.

10. The method of claim 7, wherein the entire method is performed in a period of less than 6 hours.

11. A method of replacing a baffle plate extending in a radial direction between an exhaust cylinder and a diffuser shell of an industrial gas turbine, the industrial gas turbine having a turbine cylinder attached to the exhaust cylinder, the method comprising the acts of:
- unfastening and removing fastening members from a holding ring attached to the diffuser shell via the fastening members, the unfastening occurring in the radial direction relative to a longitudinal axis of the industrial gas turbine;
- removing the holding ring; and
- removing the baffle plate, the act of removing the baffle plate comprising disengaging a distal end of the baffle plate from an inner circumferential slot of the exhaust cylinder of the industrial gas turbine by pulling the baffle plate radially inwardly from within the diffuser shell of the industrial gas turbine,
- wherein the acts of unfastening and each of the acts of removing are performed while the exhaust cylinder of the industrial gas turbine is attached to the turbine cylinder of the industrial gas turbine.

12. The method of claim 11, further comprising the acts of:
- a replacement baffle plate corresponding to the removed baffle plate;
- inserting the removed holding ring;
- inserting the removed fastening members, in the radial direction, into the holding ring to attach the holding ring to the diffuser shell; and
- fastening the fastening members to secure in place the holding ring and the replacement baffle plate,
- wherein each of the acts of inserting and the act of fastening, are performed while the exhaust cylinder of the industrial gas turbine is attached to the turbine cylinder of the industrial gas turbine.

13. The method of claim 12, wherein the entire method is performed by one person or by a two-person crew.

14. The method of claim 12, wherein the entire method is performed in a period of less than 6 hours.

15. The method of claim 11, wherein the holding ring is directly attached to the baffle plate so that the removing of the holding ring and the removing of the baffle plate are performed simultaneously.

16. The method of claim 11, wherein the industrial gas turbine is a 501F class gas turbine.

* * * * *

UNITED STATES PATENT AND TRADEMARK OFFICE
CERTIFICATE OF CORRECTION

PATENT NO.        : 9,822,664 B1
APPLICATION NO.   : 13/827800
DATED             : November 21, 2017
INVENTOR(S)       : Kush et al.

It is certified that error appears in the above-identified patent and that said Letters Patent is hereby corrected as shown below:

In the Claims

At Column 14, Line 37 (Claim 12, Line 3), please replace "a replacement baffle plate corresponding to the removed" with --inserting a replacement baffle plate corresponding to the removed--.

Signed and Sealed this
Twenty-seventh Day of March, 2018

Andrei Iancu
*Director of the United States Patent and Trademark Office*